United States Patent Office 3,503,975
Patented Mar. 31, 1970

3,503,975
SUBSTITUTED 4-PHENYL QUINAZOLINE AND 4-PHENYL QUINAZOLINE 3-OXIDE AND PREPARATION THEREOF
George Francis Field, Nutley, and Leo Henryk Sternbach, Upper Montclair, N.J., assignors to Hoffmann-La Roche Inc., Nutley, N.J., a corporation of New Jersey
No Drawing. Original application Dec. 3, 1964, Ser. No. 415,793, now Patent No. 3,398,139, dated Aug. 20, 1968. Divided and this application Apr. 9, 1968, Ser. No. 735,475
Int. Cl. C07d *51/48;* A61k *27/00*
U.S. Cl. 260—251   15 Claims

ABSTRACT OF THE DISCLOSURE

Novel substituted 1,2-dihydro-4-phenyl quinazoline 3-oxides (A) prepared by reacting 2-amino-benzophenone-β-oximes with aldehydes or ketones, and then deoxygenating the so formed 1,2-dihydro-quinazoline 3-oxides to yield 1,2-dihydro-4-phenyl quinazolines (B). (A) are useful as intermediates in the preparation of known pharmaceutically valuable benzodiazepine derivatives while (B) are themselves useful as anticonvulsant and anoretic agents.

---

This application is a divisional application of Ser. No. 415,793, filed Dec. 3, 1964, now U.S. Patent No. 3,398,-139, issued Aug. 20, 1968, which in turn is a continuation-in-part of Ser. No. 358,919, filed Apr. 10, 1964, and now abandoned and Ser. No. 400,193, filed Sept. 29, 1964, and now abandoned.

This invention relates to compounds and conversions in the field of organic chemistry. More particularly, it relates valuable processes for producing chemical intermediates, to novel chemical compounds useful as intermediates, to novel chemical compounds which are pharmaceutically useful, to methods for making them and also to methods for preparing known pharmaceutically useful compounds from said novel chemical intermediates.

5 - phenyl - 1,3-dihydro-2H-1,4-benzodiazepin-2-one 4-oxides are a valuable class of organic compounds. One method of preparing these compounds consists of reacting a 2-aminobenzophenone β-oxime with a haloacetyl halide such as chloroacetyl chloride and subjecting the so-formed 2-haloacetamido benzophenone oxime intermediate to treatment with alkali whereby there is formed the desired 5-phenyl-1,3-dihydro-2H-1,4-benzodiazepin-2-one 4-oxide. 2-aminobenzophenone oximes are capable of two steric configurations. The α-stereo isomers are oximes in which the hydroxyl group is in the syn-position to the amino group, whereas in the β-isomers, the hydroxyl group is in the anti-position to the amino group. Only the β-oximes undergo the reaction sequence above outlined, which leads to 5-phenyl-1,3-dihydro-2H-1,4-benzodiazepin-2-one 4-oxides. Unfortunately, these β-oximes of 2-aminobenzophenones are less stable and more difficulty accessible than the corresponding α-oximes. One purpose of this invention is to provide a process for converting α-oximes of aminobenzophenones to the corresponding β-configuration. It has been found that, in the presence of a heavy metal salt, α-oximes of the formula

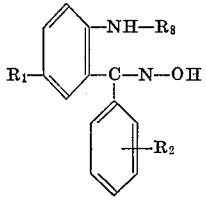

wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; and $R_8$ is hydrogen, lower alkyl, cyclo-lower alkyl or cyclo-lower alkyl-lower alkyl can be reacted with ketones or aldehydes of the formula

wherein $R_3$ and $R_4$ are each independently selected from the group consisting of hydrogen, lower alkyl, halo-lower alkyl, amino lower alkyl, aza-cyclo-lower alkyl-lower alkyl, and together, lower alkylene, aza-lower alkylene and N-lower alkyl-aza-lower akylene to form 1,2-dihydro-quinazoline 3-oxides of the formula

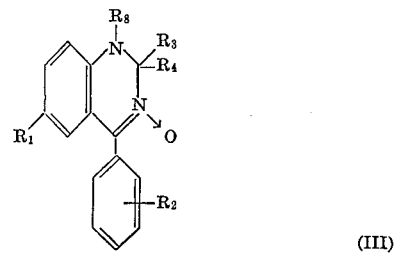

wherein $R_1$, $R_2$, $R_3$, $R_4$ and $R_8$ have the same meaning as above and the so-formed 1,2-dihydro-quinazoline 3-oxides can then be cleaved to yield β-oximes of Formula I above.

In one embodiment of the invention the intermediate 1,2-dihydro-quinazoline 3-oxide of Formula III wherein $R_8$ is hydrogen can be lower alkylated to form compounds of the formula

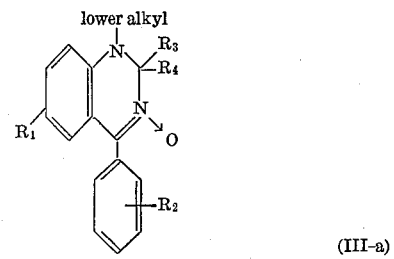

wherein $R_1$, $R_2$, $R_3$ and $R_4$ have the same meaning as above.

Compounds of Formula III–a can then be cleaved to yield β-oximes of the formula

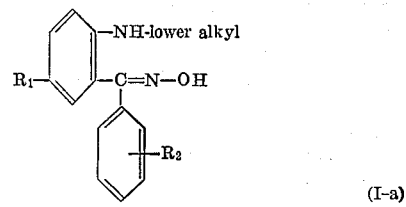

wherein $R_1$ and $R_2$ have the same meaning as above.

As used herein, lower alkyl comprehends both straight and branched chain saturated hydrocarbon groups having from 1 to 7 carbon atoms, such as methyl, ethyl, isopropyl and the like. The terms halo, halogen, halide, etc. comprehend all four halogens, i.e., bromine, chlorine, fluorine and iodine. The term halo-lower alkyl comprehends lower alkyl groups in which one or more of the hydrogen atoms have been replaced by halogen atoms. Where more than one halogen atom is present, they can be the same or different halogens. When the moiety $R_1$, $R_3$ or $R_4$ comprehends halogen or a halogen-containing group, then bromine or chlorine is preferred. When the moiety $R_2$ comprehends a halogen atom, then chlorine or fluorine is preferred. When the moiety $R_3$ or $R_4$ comprehends a halo-lower alkyl, then the α-mono-halo lower alkyls and the α,α-dihalo-lower alkyls such as α-monochloromethyl, α,α-dichloromethyl and the like are preferred. The term amino lower alkyl comprehends unsubstituted as well as mono- and di-substituted amino alkyl groups, preferably mono-lower alkyl and di-lower alkylamino alkyl groups. The term azo-cyclo-lower alkyl-lower alkyl comprehends saturated nitrogen containing heterocyclic rings preferably containing 5 or 6 ring atoms, such as piperidino or the like, bonded to the 2-position carbon atom of the quinazoline ring via a lower alkyl moiety. When $R_3$ and $R_4$ are taken together and have the meaning lower alkylene, there is comprehended a straight or branched chain hydrocarbon group, forming together with the 2-position carbon atom in Formula III, a cycloalkyl moiety, for example, cyclohexyl, or with the carbonyl radical in Formula II a cycloalkyl ketone, such as cyclohexanone. Similarly, when $R_3$ and $R_4$, taken together, are aza-lower alkylene, there is comprehended a moiety which, taken together with the 2-poistion carbon atom in Formula III, is a saturated nitrogen-containing heterocyclic ring, such as piperidine, or with the carbonyl radical in Formula II a piperidone, e.g., a 4-piperidone such as 1-methyl-4-piperidone. When $R_3$ and $R_4$ together are N-lower alkyl-aza-lower alkylenes, then said saturated nitrogen-containing heterocyclic ring contains a lower alkyl substituent on its aza-nitrogen atom; for example, as in N,3-di(lower alkyl)-piperidine or N-lower alkylpiperidine.

The process of this invention whereby an oxime of Formula I is condensed with a ketone or aldehyde of Formula II to form a 1,2-dihydro-quinazoline 3-oxide of Formula III can be conducted utilizing the ketone or aldehyde of Formula II as the reaction medium. However, it can also be conducted in an inert organic solvent, preferably one in which the oxime is substantially soluble, for example, a lower alkanol such as methanol, ethanol or the like, ether, dioxane, tetrahydrofuran, diglyme, a hydrocarbon such as benzene, toluene, or the like. The reaction can be conducted at room temperature, elevated temperatures, or below room temperature. When reacting an α-oxime of Formula I, a heavy metal salt is suitably added to the reaction medium. The anionic part of the heavy metal salt is not critical and can be derived either from an organic or inorganic acid, preferably the latter. It has been found especially suitable to utilize a cupric salt, for example, cupric sulfate, i.e., to conduct the reaction in the presence of a cupric salt, e.g., cupric sulfate. The amount of cupric sulfate used does not appear to be critical, but it has been found that cupric salts such as cupric sulfate exert a favorable influence on the reaction of the α-oxime of Formula I with a ketone or aldehyde of Formula II. Accordingly, the reaction of an α-oxime of Formula I with a ketone or aldehyde of Formula II in the presence of a cupric salt, such as cupric sulfate is a preferred embodiment of this invention. The reaction of a compound of Formula II with a β-oxime of Formula I is suitably conducted in the presence of a heavy metal salt, as described above for α-oxime, or in the presence of a basic or acidic catalyst. The quantity of catalyst present is not critical. Moreover, the catalyst can be either inorganic or organic, for example, a suitable basic catalyst is pyridine or the like and suitable acidic catalysts are hydrohalic acids such as hydrochloric acid, hydrobromic acid, acetic acid or the like.

The formation of a compound of Formula III-a from a compound of Formula III is suitably conducted by alkylating means conventional per se. For example, a compound of Formula III can be alkylated by reaction with a lower alkyl halide (preferably a bromide or iodide) in the presence of a strong base such as potassium or sodium lower alkoxide or hydride. Di-lower alkyl-sulfates can also be used to effect said alkylation.

In another aspect of this invention, 1,2-dihydro-quinazoline 3-oxides of Formulae III or III–a can be cleaved by acid hydrolysis to yield β-oximes of Formula I. The acid hydrolysis is suitably conducted in the presence of water at room temperature, below room temperature or at an elevated temperature (but the temperature should not be so high as to destroy the desired β-oxime). The hydrolysis can, if desired, be carried out in an organic solvent such as, for example, a lower alkanol, for example, methanol, ethanol or the like, dioxane, tetrahydrofuran, dimethyl sulfoxide or the like, organic solvents which themselves are not subject to acid hydrolysis.

In another embodiment of the invention, the cleavage is conducted in the presence of a ketone or aldehyde of Formula II whereby the moiety represented by the symbols $R_3$ and $R_4$ taken together with the 2-position carbon atom in Formula III can be replaced by a different moiety, for example, by subjecting a compound of Formulae III or III–a wherein $R_3$ and $R_4$ are each methyl, to acid hydrolysis in the presence of chloroacetone, there can be obtained a compound of Formulae III or III–a wherein one of $R_3$ and $R_4$ is methyl and the other is chloromethyl.

Preferred ketones of Formula II which can be used in the reaction with oximes of Formula I are, for example, acetone, chloroacetone, dichloroacetone, 1 - methyl-4-piperidone, 1,3-dimethyl-4-piperidone, piperidinoacetone and cyclohexanone. Especially preferred ketones for the conversion into β-oximes are di-lower alkyl ketones, such as acetone and methyl ethyl ketone and cyclo-lower alkanones, such as cyclohexanone. Preferred aldehydes of Formula II which can be used in said reaction are acetaldehyde, chloroacetaldehyde and dichloroacetaldehyde.

In another aspect of the present invention, compounds of Formulae III and III–a can be subjected to treatment with phosphorus trichloride or hydrogen in the presence of a catalyst such as Raney nickel whereby they are formed compounds of the formula

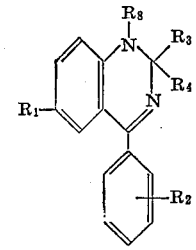

(IV)

wherein $R_1$, $R_2$, $R_3$, $R_4$ and $R_8$ have the same meaning as above.

In still another aspect compounds of Formul IV can be reduced to yield compounds of the formula

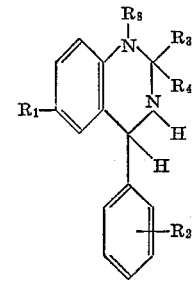

(V)

wherein $R_1$, $R_2$, $R_3$, $R_4$ and $R_8$ have the same meaning as above.

Compounds of Formula IV and of Formula V and their acid addition salts are useful as anticonvulsants and as anoretic agents.

The compounds of Formulae IV and V which, as set forth above, are pharmaceutically useful compounds, can be administered internally, for example, orally or parenterally, with dosage adjusted to individual requirements. For purposes of administration they can be placed in conventional solid or liquid pharmaceutical administration forms and can be combined with conventional pharmaceutical solid or liquid carriers. For example, said compounds of Formulae IV and V or their pharmaceutically acceptable acid addition salts can be aministered in conventional pharmaceutical administration forms, such as dispersions, capsules, emulsions, suspensions, tablets or the like, and can be combined with conventional pharmaceutical carriers or excipients such as corn starch, lactose or the like.

The compounds of Formulae IV and V form acid addition salts. For example, they form pharmaceutically acceptable acid addition salts with pharmaceutically acceptable organic or inorganic acids such as acetic acid, succinic acid, methanesulfonic acid, para-toluenesulfonic acid, maleic acid, hydrochloric acid, hydrobromic acid, phosphoric acid, sulfuric acid or the like. Acid addition salts of compounds of Formulae IV and V which are not pharmaceutically acceptable can be converted into either the free base or into pharmaceutically acceptable acid addition salts by conventional techniques, for example, by neutralization an then, if desired, by reaction with a pharmaceutically acceptable acid.

In still another specific embodiment of the invention there is provided a method for preparing known compounds of the formula

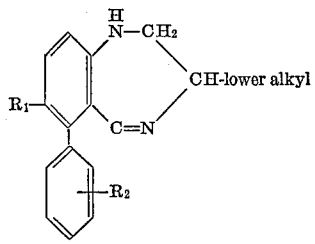

(VI)

Wherein $R_1$ and $R_2$ have the same significance as hereinbefore.

Compounds of Formula VI above can be prepared by several routes. One convenient route of preparation consists of treating a 1,2-dihydroquinazoline 3-oxide of Formula III wherein $R_3$ is lower alkyl and $R_4$ is monohalomethyl with a strong base such as, for example, an alkali metal tertiary alcoholate, e.g., lower alkyl alcoholates such as sodium or potassium t-butoxide and sodium or potassium t-amylate; an alkali metal hydride, e.g., sodium hydride, etc.; an alkali metal triphenyl methide, e.g., sodium triphenyl methide, etc.; or an alkali metal secondary amide, sodium diethyl amide, etc., thereby forming a compound of the formula

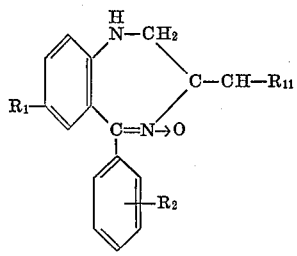

(VI-a)

wherein $R_1$ and $R_2$ have the same significance as hereinbefore and $R_{11}$ is hydrogen or alkyl of 1 to 6 C atoms.

The reaction is suitably carried out in an inert organic solvent such as ether, tetrahydrofuran, dioxane and the like. In carrying out the above reaction it is preferred to use more than one mole of strong base per mole of the quinazoline 3-oxide compound.

Compounds of Formula VI-a are converted to compounds of Formula VI by known methods of reduction as, for example, by catalytic hydrogenation with Raney nickel.

Alternatively, the compounds of Formula VI can be prepared by treating a 1,2-dihydroquinazoline of Formula IV wherein $R_3$ is lower alkyl and $R_4$ is monohalomethyl with a strong base thereby forming a compound of the formula

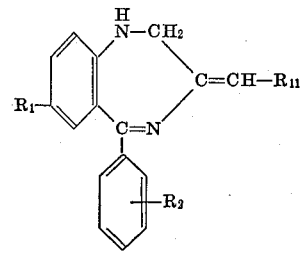

(VI-b)

wherein $R_1$ and $R_2$ have the same significance as hereinabove and $R_{11}$ is hydrogen or alkyl of 1-6 C atoms.

Compounds of Formula VI-b can then be reduced in a manner similar to the reduction of the Formula VI-a compounds thereby forming the desired Formula VI compound.

Compounds of Formulas VI-a and VI-b are characterized by the presence of an exocyclic double bond. They are novel compounds which together with their pharmaceutically acceptable salts are useful as anti-convulsants.

In yet another specific process embodiment of the invention the 1,2-dihydroquinazoline 3-oxides of Formula III, wherein $R_3$ and $R_8$ are both hydrogen and $R_4$ is lower alkyl or halo-lower alkyl, can be oxidized to form the corresponding quinazolines. The dihydroquinazoline 3-oxides of Formula III answering to the above description can be represented by the formula

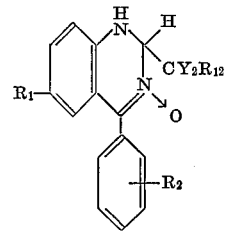

(III-c)

wherein $R_1$ and $R_2$ have the same meaning as ascribed to like symbols hereinbefore; $R_{12}$ is hydrogen, halogen or alkyl of 1 to 6 C atoms; and Y is hydrogen or halogen.

Compounds of Formula III-c can, as stated above, be oxidized to compounds of the formula

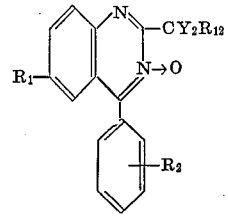

(VII)

wherein $R_1$, $R_2$, $R_{12}$ and Y have the same significance as hereinbefore by treating with an oxidizing agent such as, for example, sodium dichromate, iodine, manganese dioxide, potassium permanganate and the like with sodium dichromate being the preferred oxidant. The reaction is preferably carried out in an acidic solution. One can use either an organic or an inorganic acid. Suitable acids are, for example, the mineral acids such as sulfuric, phosphoric, etc. or the organic acids such as acetic acid, etc. The reaction can be conveniently out by simply mixing the reactants and allowing the reaction to proceed at room temperature. The quinazoline compounds prepared by oxidation with the dihydroquinazolines of Formula III-c can be further reacted to form known pharmaceutically valuable compounds. Thus, for example, the compounds of Formula VII wherein one of the Y substituents is hydrogen and the other is halogen can be reacted with ammonia or alkylamine to give known benzodiazepines such as 7-chloro-2-methylamino-5-phenyl-3H-1,4-benzodiazepine 4 - oxide. Alternatively, there can be prepared known benzodiazepin-2-ones such as, for example, 3-hydroxy-7-chloro-5-phenyl-3H-1,4-benzodiazepin-2(1H) - one by sequentially treating a compound of Formula VII wherein both Y substituents are halogen with alkali, phosphorous trichloride and an alkali metal salt of a lower alkanoic acid and thereafter hydrolyzing the product so-obtained. The methods of preparing the known benzodiazepines of Formulas VIII and IX from quinazolines of Formula VII do not constitute a part of this invention but are presented here in order that the disclosure may be complete. The method of preparing these known benzodiazepines from the dihydroquinazoline compounds of Formula III–c can be traced with respect to the following schematic diagram.

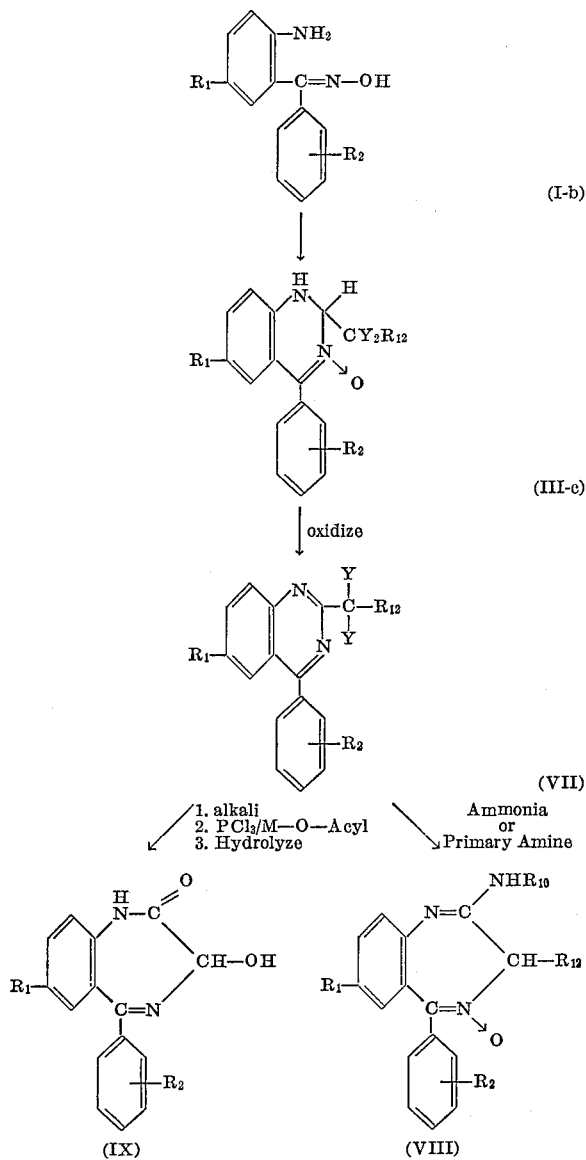

In the above formulas the symbols $R_1$, $R_2$, $R_{10}$, $R_{12}$ and Y have the same meaning as like symbols hereinabove.

The conversion of the quinazoline compounds of Formulas VII to the desired benzodiazepine compounds of Formula VIII is accomplished by reacting the quinazoline compound of Formula VII wherein one Y substituent is halogen and the other is hydrogen with ammonia or with a primary amine utilizing known techniques whereby rearrangement occurs giving the desired benzodiazepine compound.

Alternatively, the quinazoline compound of Formula VII can be converted to known benzodiazepin-2-ones of Formula IX. Such conversion is effected by initially treating a compound of Formula VII wherein both Y substituents are halogen with a suitable inorganic base such as an alkali metal hydroxide, e.g., sodium hydroxide. By this treatment, the quinazoline ring is converted into a 1,4-benzodiazepin-2-one 4-oxide which is then treated with phosphorous trichloride and an alkali metal salt of a lower alkanoic acid of the formula

wherein M is an alkali metal and the Acyl moiety is a lower alkanoyl group.

Preferably, M in the above formula is sodium and the lower alkanoyl group is acetyl. The compound so-obtained can be hydrolyzed by any convenient hydrolyzing technique known in the art such as treatment with a base in a solvent, for example, a methanolic solution of sodium hydroxide, thereby forming the desired benzodiazepin-2-one of Formula IX.

The following examples are illustrative of the invention. All temperatures are in ° C. When it is specified that an oxime of "unspecified configuration" is utilized as a starting material, it is to be understood that this comprehends a mixture of the α- and β-stereoisomers.

EXAMPLE 1

The α-oxime of 2-amino-5-chlorobenzophenone (10 g.), acetone (100 ml.) and cupric sulfate pentahydrate (0.5 g., finely ground) were heated under reflux for 2 hours. Yellow product soon began to crystallize out. The reaction mixture was cooled to room temperature and the product filtered off. It was resuspended in water (75 ml.), filtered and washed with water to remove copper sulfate, yielding 6-chloro-1,2-dihydro-2,2-dimethyl - 4 - phenylquinazoline 3-oxide as yellow prisms, M.P. 200–220°.

EXAMPLE 2

2-aminobenzophenone oxime of unspecified configuration (454 g.), acetone (6 l.) and cupric sulfate pentahydrate (30 g., fine powder) were heated under reflux overnight. The mixture was cooled to room temperature and insoluble material filtered off. The filtrate was concentrated in vacuo to small volume and the pale yellow solid collected, which upon recrystallization from acetone yielded 1,2-dihydro-2,2-dimethyl - 4 - phenylquinazoline 3-oxide as pale yellow prisms, M.P. 206–208°.

EXAMPLE 3

2-amino-5-nitrobenzophenone oxime of unspecified configuration (191.7 g., 0.746 mole), acetone (3 l.) and cupric sulfate pentahydrate (4 g., finely powdered) were heated under reflux overnight. The solution was concentrated to 1 l. under reduced pressure. The resulting solid was collected, washed with water to remove cupric sulfate, and recrystallized from acetone yielding 1,2-dihydro-2,2-dimethyl-6-nitro-4-phenylquinazoline 3 - oxide, M.P. 200–205°, yellow prisms.

EXAMPLE 4

The α - oxime of 2 - amino - 5 - trifluoromethylbenzophenone (2.0 g.) acetone (50 ml.), cupric sulfate (0.1 g. of pentahydrate) and acetic acid (2 drops) were heated under reflux for 21 hours. The solution was concentrated in vacuo and the residue crystallized from ether, collected, washed with water and recrystallized from 2-propanol yielding 1,2-dihydro-2,2-dimethyl-4-phenyl - 6 - trifluoromethylquinazoline 3-oxide as yellow needles, M.P. 224–226°.

EXAMPLE 5

6 - chloro-1,2-dihydro-2,2-dimethyl-4-phenylquinazoline 3-oxide (10 g.) was ground to a powder and stirred with 3 N hydrochloric acid (100 ml.) at room temperature for 2 hours. The resulting white solid was filtered off and suspended in water (100 ml.). The suspension was then neutralized with solid sodium carbonate, filtered, and the solid filtrate washed with water (100 ml.) by removing the solid from the filter and resuspending. The so-obtained pale yellow solid was recrystallized from benzene yielding a colorless material which was dissolved in ether (100 ml.) and washed with 10% sodium bicarbonate solution (50 ml.). The organic phase was dried (sodium sulfate) and evaporated in vacuo. The residue was then crystallized from benzene giving 2-amino-5-chlorobenzophenone β-oxime as white plates, M.P. 129–132.5°.

EXAMPLE 6

1,2-dihydro-2,2-dimethyl-4-phenylquinazoline 3 - oxide (10 g.) was finely ground and added to 3 N hydrochloric acid (250 ml.). After the suspension had been stirred for 1 hour 20 minutes, the solid was filtered off and suspended in water (150 ml.). The suspension was then neutralized with solid sodium carbonate, the product collected, washed with water and worked up as in Example 5 to give 2-aminobenzophenone β-oxime, M.P. 123–129°.

EXAMPLE 7

1,2 - dihydro-2,2-dimethyl-6-nitro-4-phenylquinazoline 3-oxide (5.0 g.) was dissolved in boiling ethanol (100 ml.). Concentrated hydrochloric acid (2 ml.) was added and the mixture kept at reflux for 5 minutes. Cold water (100 ml.) was then added and after the mixture had stood for about 0.5 hour, the precipitate was collected, and washed with water (2× 25 ml.). Recrystallization from aqueous ethanol yielded 2-amino-5-nitrobenzophenone β-oxime, M.P. 200–206°.

EXAMPLE 8

1,2 - dihydro - 2,2-dimethyl-4-phenyl-6-trifluoromethylquinazoline 3-oxide (1.0 g.) in a finely divided state was added to 3 N hydrochloric acid (50 ml.) and the suspension stirred at room temperature for 45 minutes. The solid was filtered off and suspended in water (100 ml.). Since the product did not crystalline readily on the addition of sodium carbonate, methylene chloride (75 ml.) was also added. The aqueous phase was made alkaline with solid sodium carbonate, and the phases separated. After drying (sodium sulfate) the methylene chloride solution was concentrated to leave a yellow oil which was crystallized from benzene/hexane to give 2-amino-5-trifluoromethylbenzophenone β-oxime as an off-white solid, M.P. 113–116° (sinter at 110°).

EXAMPLE 9

6' - chloro - 1,3 - dimethyl-4'-phenylspiro(piperidino-4,2'-(1'H)-quinazoline) 3-oxide (1.9 g.) was stirred with 3 N hydrochloric acid (50 ml.) for 1.5 hour. The resulting solid was filtered off and suspended in water (100 ml.). The suspension was then neutralized with solid sodium carbonate in the presence of some methylene chloride (to aid crystallization). The methylene chloride was boiled off and the yellow solid collected and recrystallized from benzene/hexane yielding 2-amino-5-chlorobenzophenone β-oxime melting at 129–132°.

EXAMPLE 10

6 - chloro - 2,2 - bis(chloromethyl) - 1,2 - dihydro - 4-phenylquinazoline 3-oxide (5 g.), dioxane (25 ml.) and methanolic hydrogen chloride (4 ml. of 7 M) were heated under reflux for 40 minutes. The mixture was cooled, diluted with ether (100 ml.) and allowed to stand overnight. The precipitate was collected, and suspended in water. The suspension was then neutralized with solid sodium carbonate and the resulting solid collected and recrystallized from benzene/hexane yielding 2-amino-5-chlorobenzophenone β-oxime, M.P. 124–131°.

EXAMPLE 11

A solution of p-toluenesulfonic acid (1 g. of monohydrate) and pyridine (1 ml.) in ethanol (250 ml.) and benzene (125 ml.) was rendered anhydrous by distillation of solvent until 250 ml. remained. 2-amino-5-chlorobenzophenone β-oxime (50 g.) and chloro-2-propanone (25 ml. technical) were added and the solution allowed to stand overnight at room temperature. After the solution had been concentrated in vacuo, the product, 6-chloro - 2 - chloromethyl-1,2-dihydro-2-methyl-4-phenylquinazoline 3-oxide, was collected. Upon two recrystallizations from methylene chloride/petroleum ether it melted at 157–159°.

EXAMPLE 12

6 - chloro - 1,2 - dihydro - 2,2 - dimethyl - 4 - phenylquinazoline 3-oxide (200 g.) and chloro 2-propanone (200 ml.) were added to ethanol (2 l.), benzene (0.5 l.) and concentrated hydrochloric acid (2 ml.). Solvent was then distilled from the mixture through a Vigreaux column. In the course of 80 minutes, 1.5 l. was collected. The reaction mixture was cooled, neutralized with 2 N ammonium hydroxide and the product precipitated with ice water (1 l.). The precipitate was collected and washed with ethanol and then ether to give 6-chloro-2-chloromethyl - 1,2 - dihydro-2-methyl-4-phenylsuinazoline 3-oxide as a yellow solid, M.P. 150–158° (dec.).

EXAMPLE 13

1,2 - dihydro - 2,2 - dimethyl - 4 - phenylquinazoline 3-oxide (5.0 g.) ethanol (50 ml.), chloroacetone (5 ml. of technical) and concentrated hydrochloric acid (0.05 ml.) were mixed, and solvent was distilled out for 45 minutes while ca. 20 ml. was collected. The solution was cooled, neutralized with 1 N sodium hydroxide, and diluted with water to a total volume of ca. 60 ml. The pale yellow precipitate was collected, washed with water, and recrystallized three times from ethyl acetate yielding 2 - chloromethyl - 1,2-dihydro-2-methyl-4-phenylquinazoline 3-oxide as pale yellow spars, M.P. 158–161° (dec.).

EXAMPLE 14

1,2 - dihydro - 2,2 - dimethyl - 6 - nitro - 4 - phenylquinazoline 3-oxide (25 g.), ethanol (250 ml.), concentrated hydrochloric acid (0.2 ml.) and chloroacetone (25 ml. of technical) were mixed, and the solvent distilled out for 25 minutes. The distillate amounted to 178 ml. The residue was cooled on ice and the precipitate was collected yielding 2-chloromethyl-1,2-dihydro-2-methyl-6-nitro-4-phenylquinazoline 3-oxide as yellow prisms, M.P. 218–221° upon three recrystallization from ethanol.

EXAMPLE 15

2-amino-5-chlorobenzophenone β-oxime (10.0 g.) was dissolved in methanol (100 ml.), cooled to 10° and methanolic hydrogen chloride (5 ml. of 1 N) and a solution of 1,3-dichloropropanone (7.74 g.) in methanol (25 ml.) were added. The reaction mixture was allowed to warm to room temperature and let stand at that temperature (ca. 25°) for 0.5 hour. Crystallization occurred after approximately 15 minutes. The mixture was then cooled on ice and the resulting solids collected and washed with hexane yielding 6-chloro-2,2-bis(chloromethyl) - 1,2 - dihydro-4-phenylquinazoline 3-oxide which upon three recrystallizations from ethyl acetate was obtained as yellow needles, M.P. 171–172°.

EXAMPLE 16

6 - chloro - 1,2 - dihydro - 2,2 - dimethyl - 4 - phenylquinazoline 3-oxide (200 g.), 1,3-dichloropropanone (200 g.), ethanol (2 l.), benzene (400 ml.), and concentrated hydrochloric acid (2 ml.) were combined and solvent distilled off. During 1 hour, 1.2 l. of solvent was collected. The reaction mixture was then cooled on ice and neutralized with 2 N ammonium hydroxide (40 ml.). The resulting solid product was collected and washed with 1:1 ether/ethanol (200 ml.) yielding 6-chloro-2,2-bis(chloromethyl) - 1,2 - dihydro - 4 - phenylquinazoline 3-oxide, M.P. 169–171°.

EXAMPLE 17

A solution of 10 g. of 2-amino-5-chlorobenzophenone β-oxime in 100 ml. of acetone containing 2 drops of glacial acetic acid was heated under reflux for 20 min. The reaction mixture was cooled to 0° and the yellow solid, 6-chloro-1,2-dihydro - 2,2-dimethyl - 4-phenylquinazoline 3-oxide, which separated was collected. Upon crystallization from methylene chloride/acetone, it formed yellow rods, M.P. 221–222°.

EXAMPLE 18

2-amino - 5-chlorobenzophenone oxime of unspecified configuration (300 g.) was refluxed with mechanical stirring with acetone (3 l., C.P.) with the addition of cupric sulfate (15 g. of pulverized pentahydrate) and glacial acetic acid (3 ml.) for 7–8 hrs. After 2–3 hrs., yellow crystals of 6-chloro-1,2-dihydro-2,2-dimethyl - 4-phenylquinazoline 3-oxide began to precipitate from the brown solution. The reaction mixture was then allowed to cool to room temperature overnight. The product was filtered off and washed with water (2× ca. 200 ml.) to remove the cupric sulfate, yielding 6-chloro-1,2-dihydro - 2,2-dimethyl-4-phenylquinazoline 3-oxide as yellow prisms.

EXAMPLE 19

Chloroacetaldehyde diethylacetal (46 ml.) was heated under reflux for 15 min. with 1.5 N hydrochloric acid (46 ml., 0.069 mole). This solution was cooled to 10° and added to a cold (10°) solution of 2-amino-5-chlorobenzophenone β-oxime (49.3 g.) prepared by dissolving the oxime in warm ethanol (100 ml.) and cooling. The mixture was stirred without further cooling for 15 min. (reaction is exothermic). The product, 2-chloromethyl-6-chloro - 1,2-dihydro - 4-phenylquinazoline 3-oxide, separated and was collected and washed with hexane. Upon three recrystallizations from 2-propanol, it melted at 165–167°, yellow plates.

EXAMPLE 20

Piperidinoacetone was prepared by adding chloroacetone (8 ml., technical, ca. 75 mmole) dropwise to a solution of piperidine (20 ml., 0.202 mole) in ether (50 ml., anhydrous). The mixture was refluxed 0.5 hr., the piperidine hydrochloride was filtered off, and washed with ether, and the filtrate concentrated in vacuo to leave oily residue (12.77 g.) which was used without further purification. To this was added 2-amino-5-chlorobenzophenone β-oxime (17 g.) in ethanol, then concentrated hydrochloric acid (10 ml.) to adjust the pH of the solution to 1–3, and finally benzene (100 ml.). A portion of the solvent (150 ml.) was distilled out, and the mixture allowed to stand overnight. The yellow solid which separated was collected and partitioned between methylene chloride and 10% sodium carbonate solution. The methylene chloride extract was dried and concentrated in vacuo. The residue crystallized from ether to yield 6-chloro - 1,2-dihydro - 2-methyl - 4-phenyl-2-(piperidinomethyl)quinazoline 3-oxide as a yellow solid, which upon three recrystallizations from ethanol formed yellow prisms, M.P. 193–194°.

The free base, 6-chloro - 1,2-dihydro - 2-methyl-4-phenyl - 2-(piperidinomethyl)quinazoline 3-oxide (3.7 g.), was dissolved in methanol (100 ml.), the solution was filtered and maleic acid (1.16 g.) added to it. The solution was then diluted with ether (500 ml.) and the pale yellow needles of 6-chloro-1,2-dihydro - 2-methyl-4-phenyl - 2-(piperidinomethyl)-quinazoline 3-oxide maleate which formed, collected and crystallized three times from methanol/ether, yielding yellow prisms, M.P. 115–130° (dec.).

EXAMPLE 21

2-amino-5-chlorobenzophenone β-oxime (50 g.) was dissolved in methanol (250 ml.) and the solution cooled to 5°. Acetic acid (5 ml.) and acetaldehyde (20 ml.) were added (exothermic reaction). The mixture was kept on ice approximately 1 hr. and the product, 6-chloro-1,2-dihydro - 2-methyl - 4-phenylquinazoline 3-oxide, which separated was collected. After recrystallization from 2-propanol/water and then three times from 2-propanol, it melted at 174–176° (dec.).

EXAMPLE 22

6-chloro - 1,2-dihydro - 2,2-dimethyl - 4-phenylquinazoline 3-oxide (5 g.) was dissolved in chloroform (100 ml.) and phosphorus trichloride (2 ml.) in chloroform (20 ml.) and the mixture was heated under reflux for 0.5 hr. The resultant red solution was poured into 1,2 N sodium hydroxide (100 ml.). The phases were separated and the chloroform washed with 10% sodium bicarbonate solution (50 ml.) and brine (50 ml.) and dried (sodium sulfate). The solution was then filtered through alumina (50 g.), and the alumina washed with methylene chloride (100 ml.). The eluate was concentrated in vacuo and the residue crystallized from hexane to give 6-chloro-1,2-dihydro - 2,2-dimethylquinazoline as a yellow solid which upon repeated crystallization from ethanol/water and hexane/ether formed yellow needles melting at 142–144.5°.

The so-formed free basic (3.3 g.) was dissolved in ethanol (30 ml.) and then 10 N methanolic HCl (2 ml.) and ether (200 ml.) added. The precipitated 6-chloro-1,2-dihydro - 2,2-dimethyl - 4-phenylquinazoline hydrochloride had a M.P. 120–125° (dec.), orange needles.

EXAMPLE 23

6-chloro - 1,2-dihydro - 2,2-dimethylquinazoline (5.0 g.) was dissolved in methanol (400 ml.) and the solution cooled on ice. Sodium borohydride (2.5 g.) was added. The mixture was stirred 6 hrs. on ice. It was then neutralized with acetic acid and concentrated to dryness in vacuo. The residue was dissolved in methylene chloride (200 ml.) and the solution washed with water (100 ml.) and dried over sodium sulfate. Concentration in vacuo left a pale yellow oil. A portion of this oil (2.73 g.) was dissolved in methanol (10 ml.) and treated with 10 N methanolic hydrogen chloride (1 ml.) and ether (80 ml.). 6-chloro - 2,2-dimethyl - 4-phenyl - 1,2,3,4-tetrahydroquinazoline hydrochloride separated as a yellow solid, which was collected and melted at 220–240° (dec.).

EXAMPLE 24

A mixture of 5-chloro-2-methylaminobenzophenone oxime (mixture of stereo isomers) (10 g.), cupric sulfate pentahydrate (0.1 g.), acetone (100 ml.) and chloroform (100 ml.) was refluxed overnight while passing the distillate through a Soxhlet extractor containing anhydrous sodium sulfate. The cupric sulfate was filtered off and the solvents then removed in vacuo. The residue was crystallized from ethyl acetate. Recrystallization from petroleum ether and from ethanol/water gave 6-chloro-1,2-dihydro - 1,2,2 - trimethyl-4 - phenylquinzoline 3-oxide as yellow rods of M.P. 115–116°.

EXAMPLE 25

6-chloro - 1,2-dihydro - 2,2-dimethyl-4 - phenylquinazoline 3-oxide (57.4 g.) was suspended in tetrahydrofuran (2 l.) and the mixture cooled at 7°. To this mixture was added potassium t-butoxide (25 g.). The mixture was stirred 3 min. and methyl iodide (50 ml.) was added. The mixture was stirred a further 15 min. during which time the color faded from red to yellow, and then filtered through Celite. The filtrate was evaportaed in vacuo and the residue treated with hexane to give a stocky yellow solid which was recrystallized from ethanol/water to give crude 6-chloro - 1,2-dihydro-1,2,2 - tri methyl-4-phenylquinazoline 3-oxide.

EXAMPLE 26

6-chloro - 1,2-dihydro - 1,2,2-trimethyl - 4-phenylquinazoline 3-oxide (10 g.), ethanol (150 ml.) chloroacetone (10 ml. tech.) and concentrated hydrochloric acid (0.3 ml.) were treated together with slow distillation of solvent for 1.5 hr. A total of 100 ml. of distillate was collected. The residue was diluted with ether (250 ml.) and washed with water (3× 250 ml.). The ether solution was dried over sodium sulfate and concentrated in vacuo to give a yellow-brown tar which was crystallized from ether to give 6-chloro-2-chloromethyl - 1,2-dihydro - 1,2-dimethyl-4-phenylquinazoline 3-oxide which by two recrystallizations from cyclohexane, was obtained as yellow prisms, M.P. 118–120°.

EXAMPLE 27

A mixture of 6-chloro-1,2-dihydro-1,2,2-trimethyl-4-phenylquinazoline 3-oxide (5.0 g.) and 3 N hydrochloric acid (25 ml.) was heated on the steam bath for 3 min. A red oil formed, and then the mixture solidified to an orangish mass. The solid was collected after the mixture was cooled. The solid was added to saturated sodium bicarbonate solution (50 ml.) and ether (100 ml.) The ether layer was washed with brine (50 ml.) and dried over sodium sulfate. The residue from evaporation of the ether solution, was crystallized from hexane to give 5-chloro-2-methylaminobenzophenone β-oxime as pale yellow needles, which upon recrystallization from hexane melted at 91–93°.

EXAMPLE 28

A suspension of 10 g. (29.2 mmole) of 6-chloro-2-dichloro-methyl - 1,2-dihydro - 4-phenylquinazoline 3-oxide in 300 ml. of refluxing ethanol was treated with 60 ml. of 1 N aqueous sodium hydroxide. This mixture was heated under reflux for 35 min., cooled on ice and concentrated in vacuo. The residue was partitioned between 200 ml. of methylene chloride and 200 ml. of water. After the mixture had been acidified with acetic acid, the methylene chloride phase was separated and the aqueous phase washed with 50 ml. of methylene chloride. The combined methylene chloride extracts were washed with 200 ml. of water and dried over sodium sulfate. Evaporation of the solvent in vacuo gave the 7-chloro-1,3-dihydro - 5-phenyl - 2H-1,4 - benzodiazopin-2-one 4-oxide product melting at 225–230° (dec.).

We claim:
1. A compound selected from the group consisting of compounds of the formula

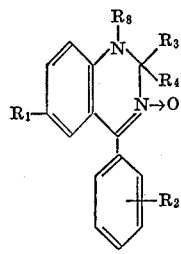

and salts thereof:
wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; $R_3$ and $R_4$ are each independently selected from the group consisting of hydrogen, lower alkyl, halo-lower alkyl, piperidinomethyl, and together, lower alkylene and aza-lower alylene; and $R_8$ is selected from the group consisting of hydrogen and lower alkyl.

2. 6-halo - 1,2-dihydro-2,2 - di(lower alkyl) - 4-phenylquinazoline 3-oxide.
3. 6-chloro - 1,2-dihydro - 2,2-dimethyl-4 - phenylquinazoline 3-oxide.
4. 6-nitro - 1,2-dihydro - 2,2-dimethyl - 4-phenylquinazoline 3-oxide.
5. 6-trifluoromethyl - 1,2-dihydro - 2,2-dimethyl - 4-phenylquinazoline 3-oxide.
6. 6-chloro - 2,2-bis(halomethyl) - 1,2-dihydro - 4-phenyl quinazoline 3-oxide.
7. 6-chloro - 2-methyl - 2-piperidinomethyl - 1,2-dihydro-4-phenylquinazoline 3-oxide.
8. 6-chloro - 2-halomethyl - 1,2-dihydro - 2-methyl-4-phenylquinazoline 3-oxide.
9. A compound selected from the group consisting of compounds of the formula

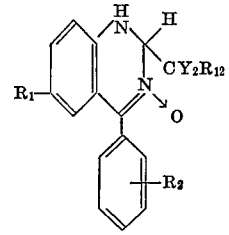

wherein $R_1$ is selected from the group consisting of hydrogen, halogen, nitro, lower alkyl lower alkoxy, trifluoromethyl, cyano and lower alkylthio; $R_2$ is selected from the group consisting of hydrogen and halogen; $R_{12}$ is selected from the group consisting of hydrogen and halogen; and Y is selected from the group consisting of hydrogen and halogen.

10. 6 - chloro - 2 - chloromethyl - 1,2 - dihydro - 4-phenylquinazoline 3-oxide.
11. 6 - chloro - 2 - dichloromethyl - 1,2 - dihydro - 4-phenylquinazoline 3-oxide.
12. 6 - chloro - 2 - trichloromethyl - 1,2 - dihydro - 4-phenylquinazoline 3-oxide.
13. A process for the preparation of compounds of claim 1 which comprises reacting an oxime of the formula

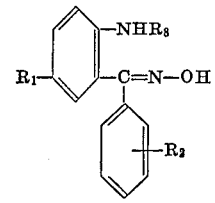

wherein $R_1$ is selected from the group consisting of hydrogen, halogen, lower alkyl, lower alkoxy, nitro, trifluoromethyl, cyano and lower alkylthio; $R_2$ is selected from the group consisting of hydrogen and halogen; $R_8$ is selected from the group consisting of hydrogen and lower alkyl with a compound of the formula

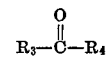

wherein $R_3$ and $R_4$ are each independently selected from the group consisting of hydrogen, lower alkyl, halo-lower alkyl, piperidinomethyl, and together, lower alkylene and aza-lower alkylene.

14. A compound selected from the group consisting of compounds of the formula

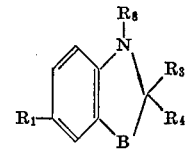

and salts thereof:

wherein B is selected from the group consisting of

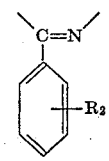

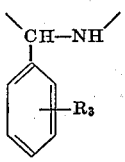

$R_1$ is selected from the group consisting of hydrogen, halogen, lower alkyl, lower alkoxy, nitro, trifluoromethyl and lower alkylthio; $R_2$ is selected from the group consisting of hydrogen and halogen; $R_3$ and $R_4$ are each independently selected from the group consisting of hydrogen, lower alkyl, halo-lower alkyl, piperidinomethyl, and together, lower alkylene and aza-lower alkylene; and $R_8$ is selected from the group consisting of hydrogen and lower alkyl.

15. 6 - chloro - 1,2 - dihydro - 1,2,2 - trimethyl - 4-phenylquinazoline 3-oxide.

References Cited

UNITED STATES PATENTS 3,398,139   8/1968   Field et al. _____ 260—239

ALEX MAZEL, Primary Examiner
R. V. RUSH, Assistant Examiner

U.S. Cl. X.R.

260—256.4, 256.5; 424—251